May 14, 1929.  N. T. McKEE  1,712,928
LOCOMOTIVE ARRANGEMENT
Filed Dec. 8, 1926   5 Sheets-Sheet 1
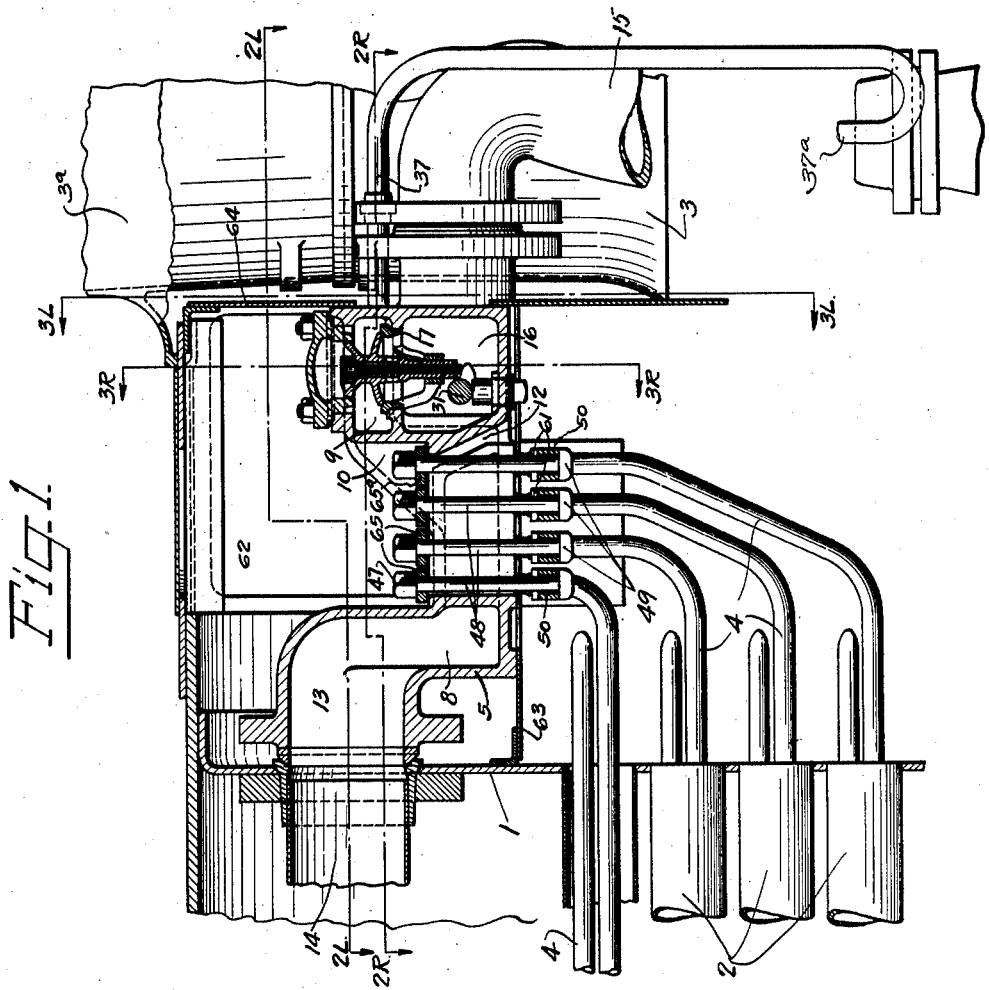
NEAL T. McKEE INVENTOR.
BY O. V. Thiele
ATTORNEY.

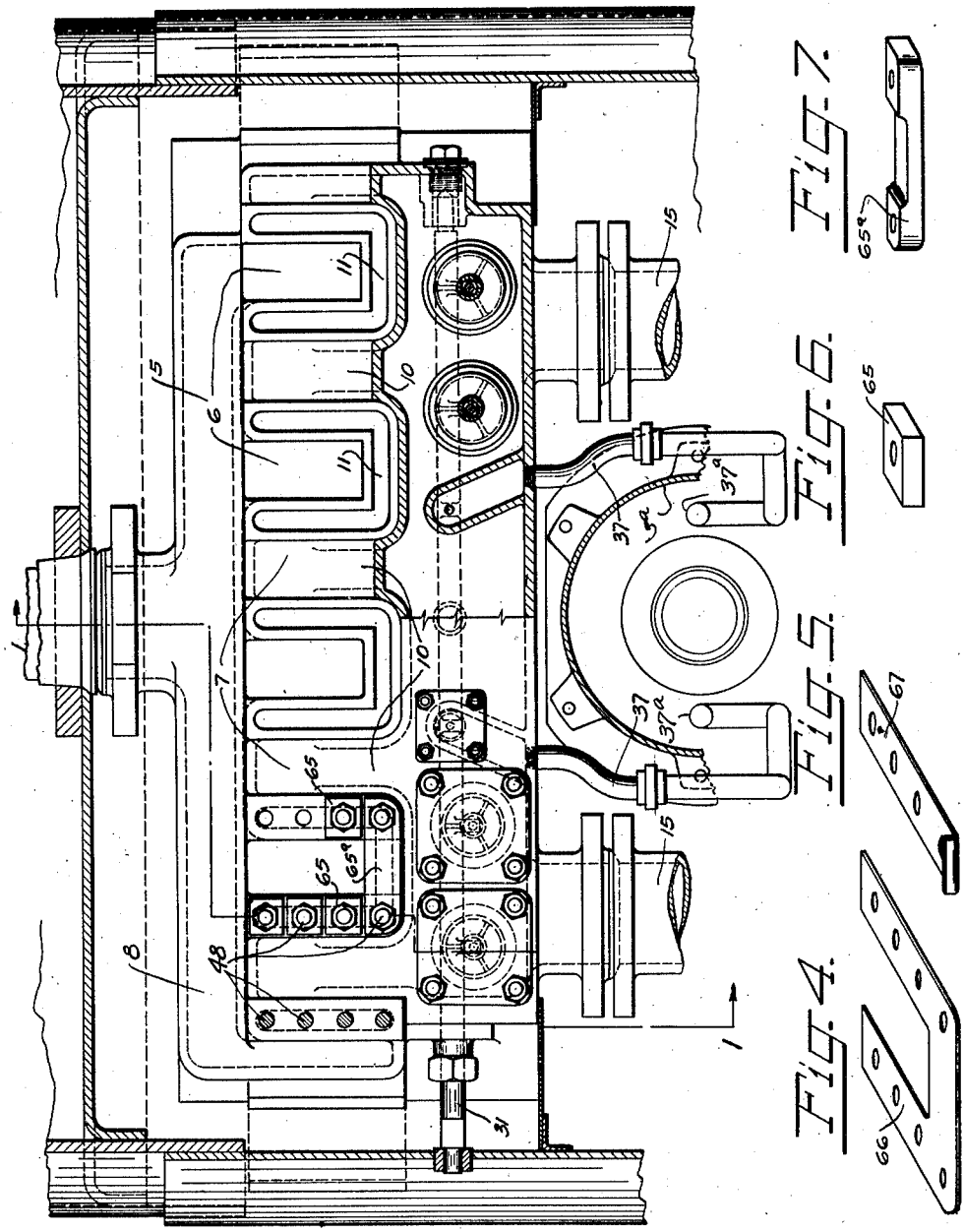

May 14, 1929.  N. T. McKEE  1,712,928
LOCOMOTIVE ARRANGEMENT
Filed Dec. 8, 1926  5 Sheets-Sheet 3
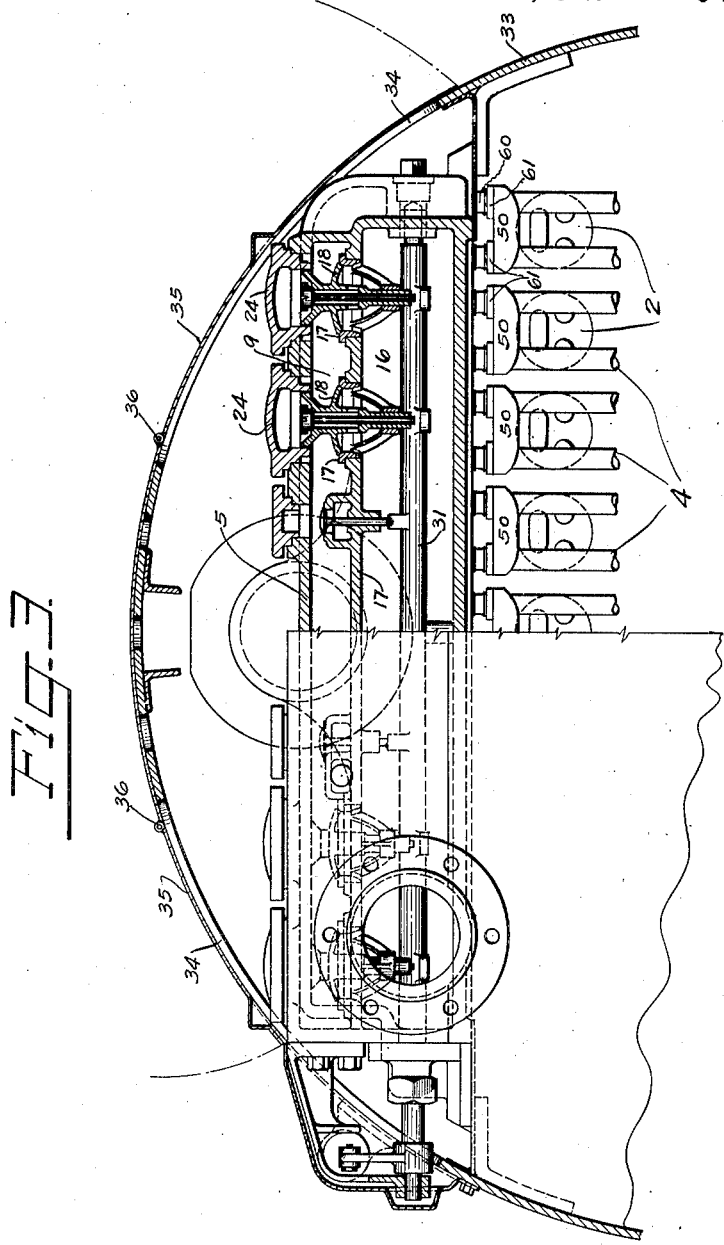
NEAL T. McKEE INVENTOR.
BY O. V. Thiele
ATTORNEY.

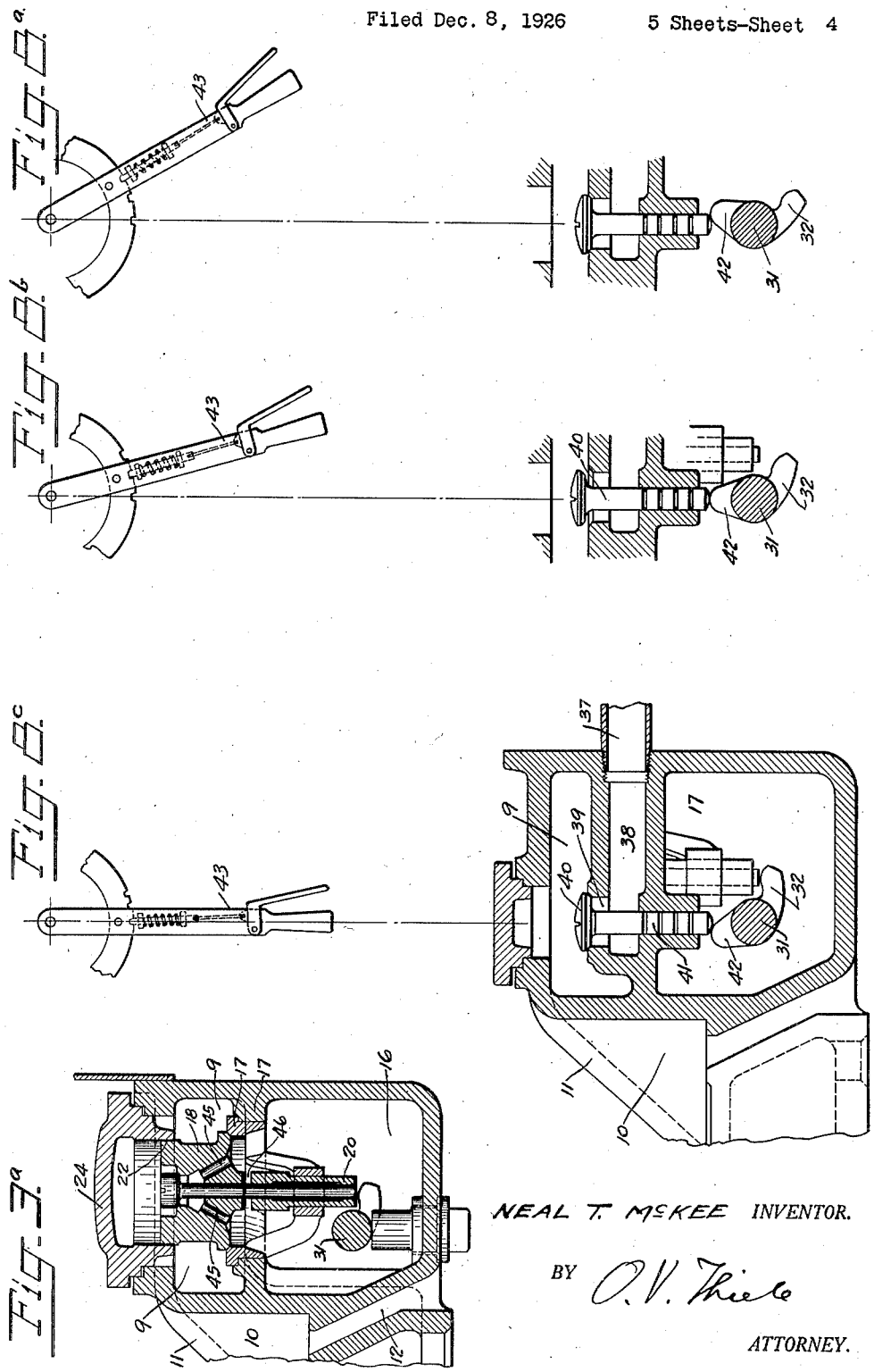

May 14, 1929.   N. T. McKEE   1,712,928
LOCOMOTIVE ARRANGEMENT
Filed Dec. 8, 1926   5 Sheets-Sheet 5
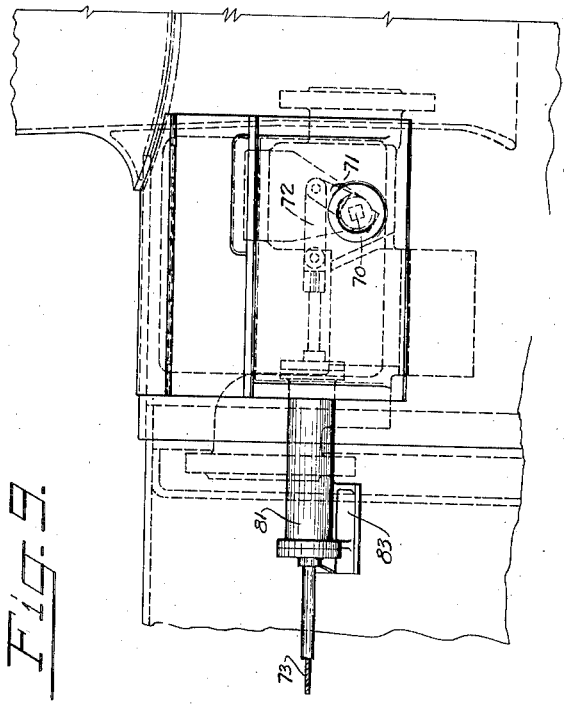
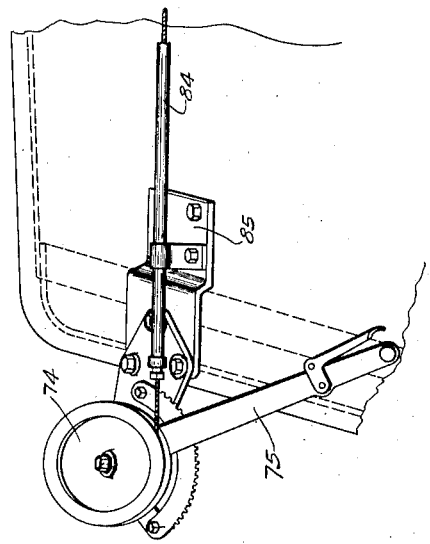
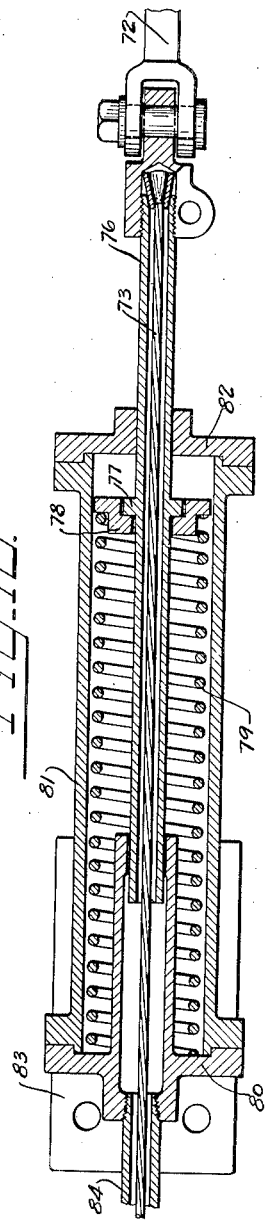
NEAL T. McKEE INVENTOR.
BY O. V. Thiele
ATTORNEY.

Patented May 14, 1929.

1,712,928.

UNITED STATES PATENT OFFICE.

NEAL T. McKEE, OF BRONXVILLE, NEW YORK, ASSIGNOR TO AMERICAN THROTTLE COMPANY, INC., OF NEW YORK, N. Y.

LOCOMOTIVE ARRANGEMENT.

Application filed December 8, 1926. Serial No. 153,329.

The present invention relates to locomotives and has particular reference to superheater headers and throttles of the multiple type disclosed in U. S. patent to R. M. Brown, Reissue 16,285 of March 9th, 1926. Its object is to provide improvements in connection with said type of superheater headers and multiple throttle. More specifically the invention contemplates a better form of balancing the throttles; to make the combined header and throttles more compact, particularly shorter from front to back; to make it more readily accessible; to provide a practically automatic operation of the blower; and to improve the throttle operating mechanism. Other and more detailed objects of the invention will become clear from the following specification.

The invention is illustrated in the accompanying drawings in which Fig. 1 is a longitudinal central section of the portion of the locomotive with which my improvement is intimately associated; Fig. 1ª is an enlarged sectional view of a portion of Fig. 1; Fig. 2 is a composite view, the left portion being a section on line 2L—2L of Fig. 1 and the right portion being a section on 2R—2R of Fig. 1; Fig. 3 is also a composite sectional view, the left half being a section on line 3L—3L of Fig. 1, and the right half being a section on line 3R—3R of Fig. 1; Fig. 3ª is a view similar to Fig. 1ª showing a variation; Figs. 4, 5, 6 and 7 are perspective details of parts used in my device; Figs. 8ª, 8ᵇ and 8ᶜ are more or less diagrammatic views illustrating three different positions of the operating lever and the corresponding positions of one of the valves; Fig. 9 is a fragmentary elevation of the upper portion of a locomotive illustrating my improved mechanism for operating the throttles, and Fig. 10 is a sectional detail of one of the elements of Fig. 9.

The locomotive in connection with which the invention is illustrated is of an ordinary type equipped with a flue superheater. The front flue sheet 1 has extending backward from it the flues 2—2, these flues delivering the products of combustion from the firebox to the smokebox of the locomotive, whence they escape through the stack extension 3 and the stack 3ª. Into these flues 2—2 extend the tubular superheater elements 4—4, whose ends are secured to the header 5. This superheater header comprises two sets of intermeshed fingers or branches 6—6 and 7—7. The fingers 6 all open up from the compartment 8, while the fingers 7—7 all communicate with the chamber 9 through the passages 10—10. The upper wall 11 of each of these passages 10 slopes back quite a distance to a point on the upper surfaces of the fingers 7—7 so as to provide ample room for the steam flow from these fingers to the chamber 9. This is one of the features of the present invention. The fingers 6—6 are separated on three sides from the remainder of the header casting to allow for free expansion and contraction of these fingers with respect to the remaining portions of the casting. This feature in itself is not novel. However, I provide a particularly compact arrangement of the header, especially as far as the fore and aft dimension is concerned, by sloping the air space 12, which separates the fingers from the casting at the front. The superheater units or elements 4—4 each have their two ends connected respectively to a finger 6 and a finger 7, as is common practice in this art. The particular means for clamping these unit or element ends to the header will be described in detail a little further on. The transverse chamber 8 communicates with the connection 13, which in turn is in open communication with the steam pipe 14, supplying steam from the boiler.

As far as described, this arrangement is, generally speaking and except as noted, not novel. Its method of operation also is old. Steam from the locomotive steam dome enters through the pipe 14, the connection 13, and reaches the space 8, from which it flows to the several fingers or sub-headers 6—6. They deliver it to the superheater elements 4—4, through which it flows and by which it is in turn delivered to the fingers or sub-headers 7—7 in a superheated state. These fingers deliver it to the chamber 9 through the passages 10—10.

In the patent to Brown referred to above, a novel throttle arrangement is protected which comprises a plurality of relatively small throttles located substantially in the same position as those used in the present invention and to be presently described. These throttles are arranged between the superheater header and the steam pipes 15—15 so that at all times the superheater header and superheater elements are filled with steam. These steam pipes 15—15 communicate with the transverse chamber 16. The chamber 16 is divided from the chamber 9 by means of the partition 17. This partition 17 has a series of apertures through it, the number of these apertures in the case illustrated being four. These apertures are equipped with bushings 17—17. On these bushings are seated the valves or throttles 18—18. One of these valves is illustrated in detail in Fig. 1ª. It has a disk-shaped body 19 and a downward extension 20. Upward from the disk-shaped body 19 extends the annular portion 21 carrying a balancing piston 22. This balancing piston reciprocates in a bore 23 of the cap 24, which closes the opening 25 in the top wall of the header. The passage 26 through the portion 21 communicates at its lower end with the space 16. Its upper end, however, is controlled by a small valve 27. The downward extension 20 of the valve is provided with a cylindrical guide in which the stem 28, which is integral with the valve 27 can reciprocate. The extension 20 itself reciprocates in a guide 29 connected integrally with the bushing 17 by means of the spider 30. The piston 22 is purposely made a rather loose fit so that there is easy leakage into the balancing chamber in the cap from the space 9. If desired a special small leakage opening from chamber 9 into the cap may be provided. It will, of course, be understood that the cap 24 is secured in any suitable steam-tight manner in its place on the header.

The foregoing description applies to each of the four valves illustrated.

The throttles just described are operated by means of the operating rod 31. This rod is mounted rotatably and is operated from the cab by mechanism which is to be described in greater detail further on. The rod is provided for each throttle with an operating finger 32 (see Fig. 1ª). This finger on the first rotation of the rod 31 in a counterclockwise direction will first engage the rod 28 of the small pilot valve, lifting it off its seat and permitting the steam which has leaked from space 19 into the cap to escape through the passage 26 into the space 16. While there was pressure in the cap 24 the valve was unbalanced, as will be evident from an inspection of the figure. The pressure on the upper side of the disc 19 was substantially balanced by the pressure in the opposite direction on the lower side of the piston 22, while the pressure on the upper side of the piston 22 was not counterbalanced by the pressure in the space 16. The release of the pressure in the cap 22 results in a practical balancing of the valve so that on further motion of the rod 31 and the finger 32 the pressure of the finger against the extension 20 will easily lift the valve 18 from its seat. It will thus be seen that I provide a balancing means separately for each throttle, and while I have described a specific form of this balancing means it may obviously be varied while still retaining the idea of having each throttle provided with its distinct balancing means. This idea I regard as an important feature of my invention.

In practice the fingers 32 of the several throttles are so arranged that they do not all open simultaneously, but one opens after another. In this way the exact amount of steam desired by the engineer is easily and precisely regulable, and certain other advantages are obtained.

When the engineer again closes one of the throttles by turning the shaft 31 in the opposite direction until the disk 18 and valve 27 seat on their respective seats, steam will quickly leak past the piston 22 into the hollow cap and the pressure thereby built up in the cap will keep the throttle and pilot valve seated.

The fact that each throttle has its own individual balancing mechanism results in the great advantage that the action of balancing the valves is practically instantaneous, the small amount of steam in the cap passing out through the passage 26 in a practically negligible length of time.

In order to facilitate access to the caps 24 and to the valves, as for inserting, inspecting or grinding them, the smoke-box shell 33 is cut away at 34—34 and a pair of covers 35—35 is provided, hinged at 36—36.

One of the advantages in having the throttling means located somewhere between the superheater and the valve chests is that there may be available at all times superheated steam for various auxiliaries. In the present instance there is illustrated a pair of valves controlling steam flow to the blowers. It is common practice and really a necessity for the engineer to turn on the blower immediately upon closing the throttle. If he fails to do this the cab will almost immediately fill with gases from the firing door of the furnace as there is no exhause steam to cause a forced draft to carry these gases off through the stack. In the arrangement illustrated herein, this condition is taken care of quite automatically. The pipes 37—37 which connect to the blowers are 37ª—37ª are supplied with steam through the passage 38, which communicates with the space 9 through the passage 39, as will be clearly seen from an inspection of Fig. 8ᶜ. This passage 39 is controlled by a small valve 40. A stem 41 extends downward through the partition 17. The rod 31 carries a small finger 42, which engages the lower end of the rod 41 to open the valve 40. The angular position of this finger 42 on the rod 31 is such that the valve 40 is operated in the proper time relation to the throttles 18. In Fig. 8ª is illustrated the position of the rod 31 and the finger 42 when all the throttles are closed. The first motion of the lever 43 into the position illustrated in Fig. 8ᵇ raises the valve 40 and steam is thus supplied to the blower. None of the fingers 32 have yet come into engagement with their throttles or the pilot valves. A further motion of the lever 43 into the position shown in Fig. 8ᶜ permits the valve 40 to seat and at the same time begins to open the first of the pilot valves to be followed immediately by an opening of the corresponding throttle. In practice both of the valves 40 controlling the steam admission to the pipes 37 will be operated simultaneously, each with a finger 42. Where only one blower is used there will, of course, be only one such valve provided.

The variation of the throttle which is illustrated in Fig. 3ª will now be briefly described. Its principal difference lies in the fact that the lower part 20 of the main throttle is made separate from the throttle body 18. The valve body 18 proper and the piston 22 are of such shape in this form that they can profitably be machined out of a solid bar. The steam escaping from the hollow cap 24 upon the opening of the pilot valve passes into the lower cavity 16 through the passages 45—45. In this form the first rotary movement of the rod 31 in a counterclockwise direction raises the pilot valve extension and the part 20 simultaneously. Play 46 between the portion 20 and the valve body delays the motion of the valve body until the pilot valve has remained open for an instant and the pressure in the cap has been released.

To secure the element ends to the header there are used in the present case means which are only slightly different from those usually employed. The provision of the covers 35 makes access to the upper side of the header very easy and it is therefore the logical and easy thing to put the nuts 47—47 on the upper side of the header where they can easily be reached for inspection and tightening. The bolts 48—48 extend through the lateral air spaces in the usual manner. Their heads 49—49 engage the clamps 50—50. Interposed between these clamps and the enlarged heads 60—60 of the superheater elements are the usual washers 61—61. The nuts 47—47 have placed under them the square washers 65—65 and the special washer 65ª, both illustrated in detail in Figs. 6 and 7. It is desirable to have ready access to the top of the header, and covers 35 are arranged for this purpose. It is necessary, however, to have an air-tight closure to prevent air from being sucked into the smoke-box. Instead of attempting to make the joint of the covers 35 tight, these covers being frequently opened, I close off the portion of the smoke-box above the header in an air-tight manner from the rest of the smoke-box. For this purpose the plate 63 extends from the flue sheet 1 to the rear end of the header. The front part of the smoke-box is closed off from said space by means of the plate 64. The openings that might exist around the square washers 65—65 and the special washer 65ª are closed by means of the small plates 66 and 67 illustrated in detail in Figs. 4 and 5 placed under the square washers 65 and the special washer 65ª.

The preferred method of operating the rotary rod 31 is illustrated in Figs. 9 and 10. The square end 70 of the shaft 31 carries the arm 71 to which is secured by a pin the link 72. This link has secured to it a cable 73 which extends rearward to the cab and is secured in the groove on the wheel 74. This wheel is given the required amount of turn by means of the throttle lever 75. Also extending rearwardly from the link 72 is the hollow bar 76 through which the cable 73 runs. This hollow bar has on it a collar 77 which engages a stepped washer 78 held in engagement with it by the compression spring 79. The other end of this spring abuts against the bottom 80 of the enclosing chamber 81. The hollow bar 76 slides through an aperture in the cover 82 of this casing. The casing has fixed to it a bracket 83 which is mounted on the boiler shell. Preferably the cable from the casing 81 back to the cab runs in a pipe 84, said pipe having one end mounted on a bracket 85 of the cab end of the boiler and its forward end screwed into the rear head of casing 81.

It will be seen that the pressure of the spring 79 against the washer 78 causes this washer to carry the hollow rod 76 and hence the cable 73 forward when the engineer releases the throttle lever 75. In other words whenever the engineer opens the throttle he compresses the spring 79 and when he releases the lever the spring closes the throttles.

This makes a peculiarly desirable arrangement in connection with the multiple throttles.

It will be obvious that modifications may be made in the arrangement described above without departing from the spirit of the invention.

I claim:

1. In apparatus of the class described, the combination of a superheater header having a chamber to which superheated steam is delivered and from which it is withdrawn for use; throttling means located between the chamber and the point of use to control said flow; a blower; a conduit from said chamber to said blower; a valve controlling the flow of steam through said conduit; and unitary manually operable means to actuate said throttling means and said valve, so constructed and arranged that in one position of the operating means both the throttling means and the valves are closed, in a second position the valve is open and the throttling means are closed, and in a third position the valve is closed and the throttling means are open.

2. In apparatus of the class described, the combination of a superheater header having a chamber to which superheated steam is delivered and from which it is withdrawn for use; throttling means located between the chamber and the point of use to control said flow; a blower; a conduit from said chamber to said blower; a valve controlling the flow of steam through said conduit; and unitary means operable by means of a lever to actuate said throttling means and said valve so constructed and arranged that in one position of the lever both the throttling means and the valve are closed, that the first part of the motion of the lever opens the valve and permits the throttling means to remain closed, that farther motion permits the valve to close and causes the throttling means to open, and that still farther motion leaves the valve closed and opens the throttling means farther.

3. In apparatus of the class described, the combination of a superheater header having an elongated chamber arranged transversely in the upper part of a locomotive smoke-box to which superheated steam is delivered and from which it is withdrawn for use; a plurality of throttles distributed along the chamber and controlling the steam flow from it; a blower; a conduit from the chamber to the blower; a valve controlling the conduit; a transverse shaft associated with said throttles and the valve and provided with portions adapted to engage and open them when the shaft is given a rotary motion; said portions being so arranged and constructed that in one position of the shaft the throttles and the valve are closed, that the first part of the motion of the shaft opens the valve but permits the throttles to remain closed, farther motion permits the valve to close and opens one throttle, and still farther motion leaves the valve closed and opens other throttles successively.

4. An integral superheater header and valve casing, comprising three parallel elongated chambers, the first and second of said chambers lying in the same plane and the third lying directly above the second; and two series of branches opening from the first and third chambers respectively; the members of one series intermeshed with those of the other series; all the members of the series communicating with the first chamber being completely separated from the header except where they open into the first chamber; the members of the other series being integrally united with the header both where they open into the third header and also at their opposite ends; the upper walls of said second series extending diagonally upward to meet the top wall of the third chamber.

5. An integral superheater header and valve casing, comprising three parallel elongated chambers, the first and second of said chambers lying in the same plane and the third lying directly above the second; and two series of branches opening from the first and third chambers respectively; the members of one series intermeshed with those of the other series; all the members of the series communicating with the first chamber being completely separated from the header except where they open into the first chamber; the members of the other series being integrally united with the header both where they open into the third chamber and also at their opposite ends; the upper walls of said second series extending diagonally upward to meet the top wall of the third chamber, the spaces separating the first series of chambers from the third chamber extending diagonally forward and downward.

6. In a locomotive, the combination of a smoke-box separated from the boiler space by the usual front flue sheet; a superheater header arranged transversely in the upper part of the smoke-box, said header comprising two parallel elongated chambers and two series of intermeshed branches opening alternately from the two chambers, those of one series being completely separated from the header except where they open into the chamber; a horizontal partition extending from the flue sheet and the smoke-box shell to the header bottom; a vertical partition extending from the header front to the smoke-box shell; closures for the spaces separating said one set of branches from the header; whereby the space above the header is divided off from the rest of the smoke-box; and doors in the smoke-box shell to give access to the upper side of the header.

NEAL T. McKEE.